Nov. 4, 1958
H. H. BARGMANN
2,858,980
MECHANICAL SECANT MULTIPLIER
Filed Oct. 19, 1955
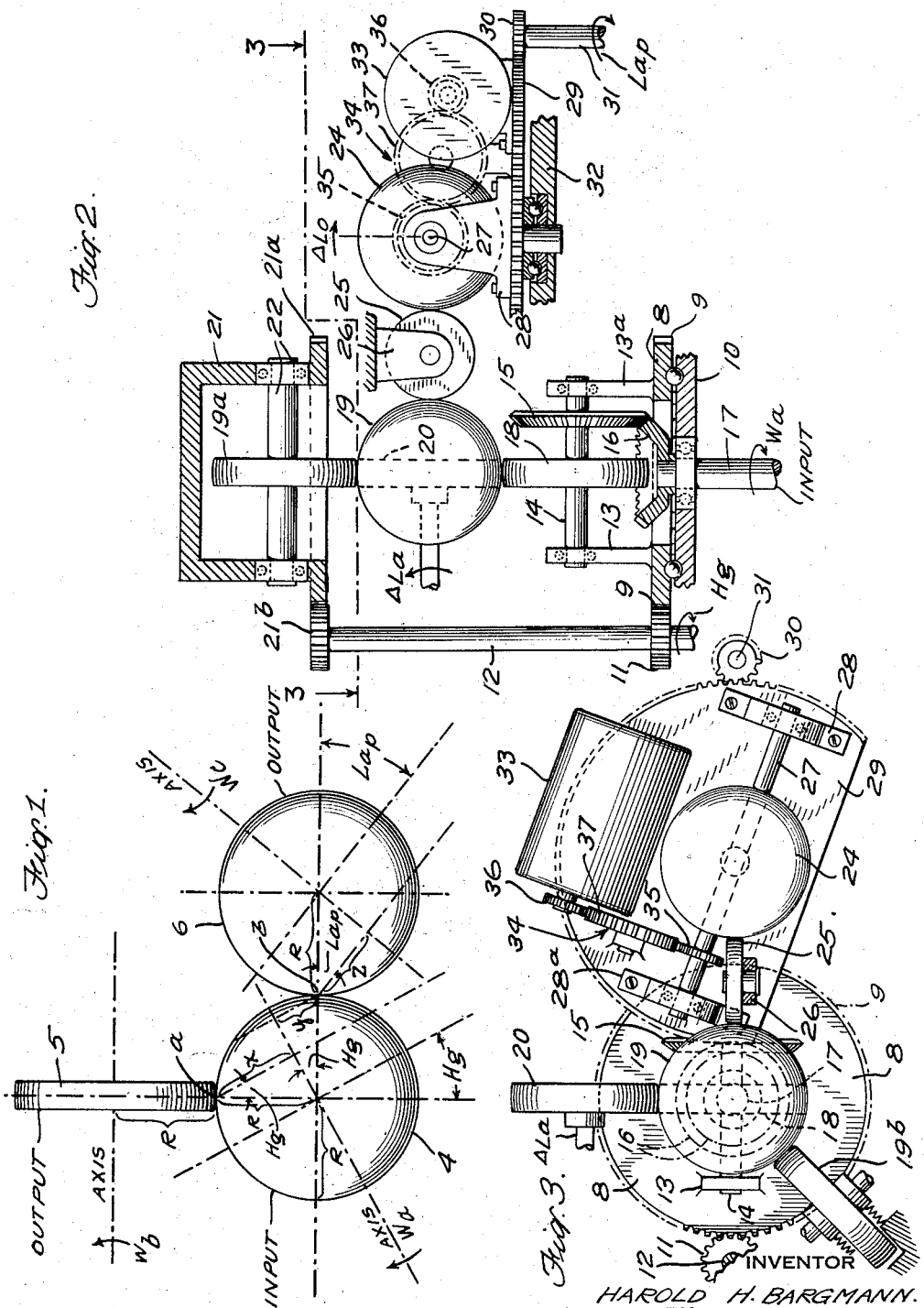
INVENTOR
HAROLD H. BARGMANN.
BY
ATTORNEY

United States Patent Office 2,858,980
Patented Nov. 4, 1958

2,858,980

MECHANICAL SECANT MULTIPLIER

Harold H. Bargmann, Groton, Conn., assignor to Sperry-Rand Corporation, Ford Instrument Company Division, Long Island City, N. Y., a corporation of Delaware Application October 19, 1955, Serial No. 541,449

2 Claims. (Cl. 235—61)

This invention relates to a mechanical computer which is adapted to yield the product of a linear input and the secant of an angular input.

Secant computers are known in the art which employ electromechanical means to operate on the output of a conventional component integrator. According to this invention solely mechanical elements are employed including elements such as are typically found in standard component integrator devices. Due to the exclusively mechanical features of the invented device the relatively large number of the additional components of the usual computing system are not required.

Basically, the modification of the component integrator consists of replacing one or both of the output rollers with an output ball. The axis of rotation of the output ball in its zero position is coincident with the axis of the roller it has replaced. Moreover, means are provided for angularly positioning the the ouput ball while maintaining it in contact with the input ball. The axis of rotation of the output ball may be imaginary or physical and may be angularly positioned in a plane containing itself and the point of contact of the first ball with the input ball and about an axis perpendicular to this plane and through the center of the output ball. The unique feature of the invention is seen to be the use of a ball to mechanically perform multiplication of its rotational input by the secant of the angle at which it is positioned.

A practical application of the secant device is embodied in a navigational computer which is especially arranged to produce an output representing increments of latitude and longitude. In this application the secant of the rotational position of the output ball must be multiplied by the sine of a second angular input and a linear input in order to determine change in longitude. Accordingly an input ball is required for driving the output ball so that the required sine component of input velocity may be represented in the output. But where the velocity component output need be determined solely in accordance with the secant function, the input ball may be replaced by a roller whose axis of rotation is fixed whereas in the computer the imaginary axis of the input ball is oriented by rollers in a plane containing itself and the point of contact of the two balls about an axis perpendicular to this plane and through the center of the input ball. The navigation computer as shown in the drawings may be employed as a simple secant multiplier providing the axis of rotation of the input ball is disposed in the same plane as the axis of the output ball and is perpendicular to its radius drawn to the point of contact of the two balls. The rotational output of the output ball ball will then simply be the product of the angular velocity of the input ball and the secant of the angle at which the axis of the output ball is positioned.

It is an object of the invention to provide a mechanical computer which is adapted to determine increments of longitude and latitude.

Another object of the invention is to provide a mechanical secant multiplier.

Other objects and advantages of the invention may be appreciated on reading the detailed description in conjunction with the drawings, in which Fig. 1 is a diagram illustrating mathematically the relation of input quantities to output quantities;

Fig. 2 is an elevation showing the basic construction embodying the invention; and Fig. 3 is a sectional plan of same taken on line 3—3 of Fig. 2.

A computer which is built in accordance with the requirements of a problem in navigation is illustrated in Figs. 2 and 3. The problem that is solved by the computer will appear most clearly from an explanation of the diagram in Fig. 1. An input ball 4 is rotated with an angular velocity $W_a$ about an axis which forms an angle $H_g$ with its axis in horizontal plane. An output roller 5 is mounted in contact with the ball 4 and is rotatable on a fixed horizontal axis. The ball 4 and roller 5 are assumed to have the same radii which are given the designation R. From the basic equation of kinematics the tangential velocity, $V_t$, of a point on the surface of a rotating spheroid is equal to the product of the angular velocity and the perpendicular distance of the point to the axis of rotation. Therefore, the tangential velocity of the point $a$, which is the point of contact of the ball 4 with the roller 5, is equal to $xW_a$ where $x$ is the perpendicular distance from the point $a$ to the axis. Since $x$ is equal to R (cos $H_g$), the tangential velocity, $V_{t_a}$, may be expressed by the equation (1) $\quad V_{t_a} = R (\cos H_g) W_a$ Since the tangential velocity on the output roller 5 at point $a$ is equal to $V_{t_a}$ on the ball, the angular output $W_b$ may be expressed as follows:

(2) $\quad W_b = \dfrac{V_{t_a}}{R} = \dfrac{R (\cos H_g) W_a}{R} = W_a (\cos H_g)$ The output of the roller 5 may be said to represent change in latitude.

The axis of rotation of output ball 6 is in the plane containing the axis of rotation of the ball 4 and the contact point $b$ of the two balls. It is assumed in the diagram that the equatorial plane of the output ball is rotated until it forms an angle $La_p$ with the horizontal. The perpendicular distance from the point of contact $b$ to the axis of the ball 4 is $y$ and to the axis of ball 6 is Z. Therefore the rotational output $W_c$ of the output ball is derived as follows:

(3) $\quad V_{t_b} = yW_a = R (\sin H_g) W_a$ (4)

$$W_c = \dfrac{V_{t_b}}{Z} = \dfrac{R (\sin H_g) W_a}{R (\cos La_p)} = W_a (\sin H_g)(\sec La_p)$$

The output of the ball 6 in this case represents change in longitude. It is to be noted that the sine function drops out of the output when the angle $H_g$ is 90° in which case a roller whose axis of rotation is similarly disposed and substituted for the ball 4 would be deemed its full equivalent.

As shown in Fig. 2 and Fig. 3 the computer includes a rotatable base 8 journalled on the platform 10 and having a peripheral gear 9 engaged by a pinion 11 on a shaft 12 operable in accordance with an angular input $H_g$. The table 8 carries a pair of standards 13 and 13ᵃ rotatably supporting a shaft 14 having a bevel gear 15 engaging a similar gear 16 on the end of a shaft 17, which is operable in accordance with the angular velocity $W^a$.

The shaft 14 also carries a disc roller 18 engaging a member 19, which, when the device is employed as a navigation computer, is a spheroid suitably supported by rollers 19a and 19b and adapted to be rotated by the roller 18 about an axis in the plan parallel to the plane in which shaft 14 is positioned by shaft 12. The roller 19a is rotatably supported in a bracket 21 secured to shaft 22 and in engagement with the spherical member 19. The bracket 21 is provided with a gear 21a engaging a pinion 21b which is fastened to the shaft 12 and the disc roller 19a is turned in unison with the roller 18. A roller 20 is arranged in contact with member 19 so that the movement imparted to it is in accordance with the product of the input of shaft 17 and the cosine of an angular input of the shaft 12 as in conventional component integrators.

The standard integrator is modified herein particularly with respect to the replacement of one of the output rollers by a pivotal output ball which is given the reference character 24. The ball 24 is preferably driven through an idler roller 25 which is rotatably supported in brackets 26 and is provided to permit greater clearance between the two balls and to isolate them so that the angular input motion of one will not be imparted to the other. The points of contact of the member 19 and the idler roller 25 and the roller 20 are ninety degrees apart in the plane containing the axes of rotation of the member 19 and the output ball 24. The ball 24 is carried on shaft 27 which is rotatably supported in brackets 28 and 28a. The brackets 28 and 28a are mounted on a sector gear 29 which is engaged by a pinion 30 mounted on the end of shaft 31 which is operated in accordance with the angular input $La_p$. A stub shaft axially mounted on the sector gear 29 is journalled in base 32 so that the gear and ball are freely rotatable thereon. As opposed to the input ball which is universally mounted, the output ball is orientable only about a fixed axis normal to the plane containing the axes of rotation of the two balls.

Since the secant of 90° is infinity, there must be some finite limit to the angular input motion of the output ball; the speed of the output ball otherwise approaching infinity as the angle through which the ball is oriented approaches 90°. Since most navigational systems do not operate about 70° latitude, a finite limit of ±70° on the sector gear to limit the angular input to the output ball is quite practical. This consideration allows for mounting of the output ball on a physical axis, rather than having an imaginary axis of rotation caused by contact with a number of rollers positioned about it, as does the main ball of a standard component integrator.

Transmitting the rotational output of the output ball mechanically from the unit would present a difficult problem in planetary gearing, requiring compensating gearing to insure the proper relative motion between all the outputs and inputs. Since most applications would require conversion to an electrical output, the problem of transmitting the output is simply solved by mounting on the sector gear 29 a synchro generator 33 which is driven by the shaft 27 of the output ball 24 by means of gear train 34 which includes gear 35 carried on the shaft 27, gear 36 mounted on the input shaft of the generator and idler gear 37 connecting the driving and driven gears of the gear train. The output information is then transmitted electrically from the unit either through a slip ring arrangement or by simply allowing the synchro leads to take up the 140° of possible motion.

Preferably the balls and rollers have the same radii in order to facilitate the calibration of the output. Where the device is to be employed simply as a secant multiplier, the ball 19 may be replaced by a disc roller rotating at some constant angular velocity in contact with the ball 24, the axis of the roller being fixed and in the same plane as the axis of the output ball 24 and disposed perpendicularly to the virtual line connecting the centers of the roller and the output ball. The radius of the fixed roller is preferably the same as the radius of the output ball. The roller would then be deemed equivalent to the ball it replaces assuming the axis of the latter is fixed and is disposed vertically to the vertical line connecting the centers of the balls so that the angle $H_g$ is 90°. In either case the output would simply be the product of angular velocity of the roller or input ball and the secant of the angle at which the output ball is positioned.

If it is desired to operate over wider angular ranges, the output ball could be mounted without a physical axis, being angularly positioned by steering rollers and having its rotational velocity transmitted to another roller in much the same manner that the main ball of the integrator receives and transmits information. It is understood that other modifications may be effected by one skilled in the art without necessarily departing from the principle and scope of the invention which is defined by the following claims.

What is claimed is:

1. A mechanical secant computer comprising a platform, a rotatable table supported on said platform, an input shaft journalled in said platform, a bevel gear affixed to said input shaft, a roller shaft supported by said table, a roller and bevel gear mounted on the roller shaft, said bevel gears being in direct engagement, a second input shaft in driving connection with said table, an input ball engaging said roller, an output ball having a physical axis of rotation, an idler roller having a fixed axis of rotation interposed between said input ball and said output ball, said input ball being in driving relation to said output ball and means including a third input shaft for orienting the axis of rotation about an axis normal thereto of said output ball, the center of said input ball and the axis of rotation of said output ball and said idler roller being in a plane perpendicular to the axis of rotation of said rotatable table, whereby the velocity of rotation of said output ball is a secant function of the displacement of said third input shaft.

2. A mechanical secant computer as claimed in claim 1 wherein there is provided a supporting roller in contact with said input ball, and a rotatable bracket supporting said supporting roller in contact with said input ball, said rotatable bracket being in driven connection with the second input shaft, whereby the roller supported by said table and said supporting roller are oriented together on said input ball by said second input shaft.

References Cited in the file of this patent

UNITED STATES PATENTS

| | | |
|---|---|---|
| 1,701,582 | Mengden | Feb. 12, 1929 |
| 1,953,894 | Crouse | Apr. 3, 1934 |
| 2,507,567 | Garnier | May 16, 1950 |
| 2,528,284 | Newell | Oct. 31, 1950 |

FOREIGN PATENTS

| | | |
|---|---|---|
| 647,696 | Great Britain | Dec. 20, 1950 |
| 839,741 | France | Jan. 7, 1939 |